US008457055B2

(12) United States Patent
Kawamura et al.

(10) Patent No.: US 8,457,055 B2
(45) Date of Patent: Jun. 4, 2013

(54) RADIO BASE STATION USED IN MOBILE COMMUNICATION SYSTEM

(75) Inventors: Teruo Kawamura, Yokosuka (JP); Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 820 days.

(21) Appl. No.: 12/438,113

(22) PCT Filed: Aug. 13, 2007

(86) PCT No.: PCT/JP2007/065821
§ 371 (c)(1),
(2), (4) Date: Apr. 7, 2009

(87) PCT Pub. No.: WO2008/023595
PCT Pub. Date: Feb. 28, 2008

(65) Prior Publication Data
US 2010/0118825 A1    May 13, 2010

(30) Foreign Application Priority Data
Aug. 22, 2006   (JP) ................................. 2006-225919

(51) Int. Cl.
*H04W 4/00* (2009.01)

(52) U.S. Cl.
USPC .......................................... 370/329; 370/343

(58) Field of Classification Search
USPC .......................................... 370/330, 329, 343
See application file for complete search history.

(56) References Cited

U.S. PATENT DOCUMENTS

| 2002/0155861 A1* | 10/2002 | Sumasu et al. ................ 455/561 |
| 2005/0030966 A1* | 2/2005 | Cai et al. ........................ 370/432 |
| 2007/0047474 A1* | 3/2007 | Anderson ..................... 370/277 |
| 2007/0153727 A1* | 7/2007 | McBeath et al. .............. 370/329 |

FOREIGN PATENT DOCUMENTS

JP         2005-65330         3/2005

OTHER PUBLICATIONS

3GPP TSG RAN WG1 LTE Ad Hoc, Cannes, France, Jun. 2006.*
International Search Report (English & Japanese) dated Nov. 27, 2007 (PCT/ISA/210 and PCT/ISA/220) (7 pages).
Written Opinion of ISA (Japanese) dated Nov. 27, 2007 (4 pages).
3GPP TSG RAN WG1 LTE Ad Hoc R1-061675 Dated Jun. 30, 2006, Cannes, France "Data-Non-Associated L1/L2 Control Channel Structure for E-UTRA Uplink" Source: NTT DoCoMo, et al. (6 pages).
Extended European Search Report for Application No. 07792464.5, mailed on Mar. 12, 2013 (11 pages).
3GPP TR 25.814 V7.0.0; "3rd Generation Partnership Project; Technical Specification Group Radio Access Network; Physical layer aspects for evolved Universal Terrestrial Radio Access (UTRA); (Release 7)"; Jun. 2006 (126 pages).

* cited by examiner

*Primary Examiner* — Sai-Ming Chan
(74) *Attorney, Agent, or Firm* — Osha Liang LLP

(57) ABSTRACT

A disclosed radio base station is used in a mobile communication system employing a single carrier scheme for uplink and includes a scheduler configured to allocate radio resources such that a first control channel accompanying an uplink data channel is transmitted using the same frequency band allocated to the uplink data channel and a second control channel, which is to be transmitted regardless of presence or absence of the uplink data channel, is transmitted using a dedicated frequency band reserved for the second control channel if no frequency band is allocated to the uplink data channel; and a reporting unit configured to report scheduling information indicating the allocation results to a user device. The scheduler is configured not to allocate the radio resources to the uplink data channel of the user device in a unit transmission period reserved for transmission of the second control channel of the user device.

4 Claims, 9 Drawing Sheets

RADIO BASE STATION USED IN MOBILE COMMUNICATION SYSTEM

TECHNICAL FIELD

The present invention generally relates to a radio base station used in a mobile communication system.

BACKGROUND ART

In the field of mobile communication technologies, research and development of next generation communication systems are being conducted at a rapid pace. In a currently proposed next generation communication system, a single carrier scheme is to be used for uplink transmission to reduce the peak-to-average power ratio (PAPR) while achieving a wide coverage area. Also in this communication system, uplink and downlink radio resources are allocated to users according to their channel conditions in the form of shared channels to be shared by the users. The process of allocating radio resources is called "scheduling". In order to perform uplink scheduling properly, each user device transmits a pilot channel to a base station and the base station estimates the uplink channel conditions of the user device based on the reception quality of the pilot channel. Similarly, in order to perform downlink scheduling properly, the base station transmits a pilot channel to the user device and the user device reports information indicating the reception quality of the pilot channel (i.e., channel quality indicator (CQI)) to the base station. Then, the base station estimates downlink channel conditions of the user device based on the reported CQI.

Meanwhile, an uplink control channel may include first control information (essential control information) that is always sent together with an uplink data channel or second control information that is sent regardless of the presence or absence of an uplink data channel. The first control information includes information that is necessary to demodulate a data channel such as a modulation scheme and a channel coding rate used for the data channel. The second control information includes a CQI, delivery confirmation information (ACK/NACK) for a downlink data channel, and/or a resource allocation request. A user device may transmit the first control information, the second control information, or both of them using uplink control channels.

In the proposed next generation communication system, when a resource block (radio resources) is allocated for transmission of an uplink data channel, the first control information and if necessary, the second control information are transmitted using the allocated resource block; and when no uplink data channel is to be transmitted, the second control information is transmitted using a dedicated resource block (dedicated frequency band). This method is described below in more detail.

FIG. 1 is a drawing illustrating an example of uplink frequency band allocation. In FIG. 1, two sizes of resource blocks (large resource blocks and small resource blocks) are provided. The large resource blocks have a bandwidth $F_{RB1}$ of 1.25 MHz and a time period $T_{RB}$ of 0.5 ms. The small resource blocks have a bandwidth $F_{RB2}$ of 375 kHz and a time period $T_{RB}$ of 0.5 ms. The time period may also be called a unit transmission period, a transmission time interval (TTI), or a subframe. One time period may correspond to the duration of one wireless packet. In FIG. 1, six resource blocks are arranged in the frequency direction and the small resource blocks are located at the right and left ends. Various arrangement patterns may be used to arrange resource blocks as long as they are known to the sending and receiving ends. In this exemplary uplink scheduling, control channels (first control channels) accompanying uplink data channels and second control channels (if necessary) are transmitted in parts of the time periods of the large resource blocks (the second, third, fourth, and fifth resource blocks). The small resource blocks (the first and sixth resource blocks) are allocated to control channels (second control channels) that are transmitted regardless of the presence or absence of uplink data channels. A second control channel of a user device may be transmitted using two small resource blocks. In this example, the second control channel of user device A is transmitted using the sixth resource block in the second subframe and the first resource block in the third subframe. Similarly, the second control channel of user device B is transmitted using the sixth resource block in the third subframe and the first resource block in the fourth subframe. In other words, a second control channel is transmitted using multiple frequency bands and time slots (i.e., the second control channel hops in the frequency and time directions). This method makes it possible to achieve frequency diversity gain and to increase the probability that the second control channel is properly demodulated by the base station.

FIG. 1 is drawn as if each small resource block is exclusively used by the corresponding user device. For example, resource blocks labeled "Control A" look like they are exclusively used by user device A. However, a resource block may be shared by multiple user devices. For example, the sixth resource block in the second subframe may be shared by user devices A and C. In this case, for example, user devices A and C share the resource block by frequency division multiplexing.

FIG. 2 is a drawing illustrating another example of uplink frequency band allocation. As in FIG. 1, two sizes of resource blocks are provided in FIG. 2. In this example, a time period $T_{RB}$ of each subframe of the small resource blocks (first and sixth resource blocks) is divided into two sub-periods. As shown in FIG. 2, a second control channel of user device A is transmitted using the sixth resource block in a first sub-period (the first half) of a third subframe and using the first resource block in a second sub-period (the second half) of the third subframe. Similarly, a second control channel of user device B is transmitted using the first resource block in the first sub-period of the third subframe and using the sixth resource block in the second sub-period of the third subframe. In other words, a second control channel is transmitted using multiple frequency bands and time slots (i.e., the second control channel hops in the frequency and time directions). This method makes it possible to achieve frequency diversity gain and to increase the probability that the second control channel is properly demodulated by the base station. Also, with this method, transmission of the control channel of user device A is completed within one subframe and transmission of the control channel of user device B is also completed within one subframe. Therefore, this method is preferable to reduce transmission delay of uplink control channels.

Also in FIG. 2, a resource block may be shared by two or more user devices. For example, the sixth resource block in the first sub-period of the third subframe may be shared by user devices A and B. In this case, user devices A and B may share the resource block by frequency division multiplexing as disclosed, for example, in 3GPP R1-061675.

DISCLOSURE OF INVENTION

Problems to be Solved by the Invention

FIG. 3 shows still another example of uplink frequency band allocation that is similar to FIG. 2. However, FIG. 3 is modified to clearly show problems in the related art. As described above, an uplink control channel may include first control information (essential control information) that is always sent together with an uplink data channel or second control information that is sent regardless of the presence or absence of an uplink data channel. The first control information includes information that is necessary to demodulate a data channel such as the modulation scheme and channel coding rate used for the data channel. The second control information includes a CQI, delivery confirmation information (ACK/NACK) for a downlink data channel, and/or a resource allocation request. In the proposed next generation communication system described above, when a resource block (radio resources) is allocated for transmission of an uplink data channel, the first control information and the second control information (if necessary) are transmitted using the allocated resource block; and when no uplink data channel is to be transmitted, the second control information is transmitted using a dedicated resource block (dedicated frequency band). For this reason and to allow user devices to stably transmit second control channels, dedicated frequency bands and time periods are reserved for the second control channels of the user devices. For example, user device UE1 transmits second control channels using radio resources labeled "A". Thus, in this example, radio resources for transmitting CQIs and/or delivery confirmation information (ACK/NACK) are reserved for user device UE1 in every two subframes. Similarly, radio resources for transmitting second control channels are also reserved for other user devices.

Assume that the second and third resource blocks in the first subframe are allocated to user device UE1 (i.e., user device UE1 is given the opportunity to transmit an uplink data channel) as shown in FIG. 3. In this case, the first control channel and the second control channel of user device UE1 are transmitted using the same second and third resource blocks used for the data channel instead of using the dedicated frequency bands (the first and sixth resource blocks). As a result, the first and sixth resource blocks in the first subframe are not used. Since a single carrier scheme is used for uplink in the system, user device UE1 can only use, in one transmission time interval, either the dedicated first and sixth resource blocks by time division multiplexing or one or more of the second through fifth resource blocks. Thus, with this scheduling method, the radio resources (dedicated frequency bands) allocated to user device UE1 are not fully utilized. In the example shown in FIG. 3, the fifth resource block is allocated to user device UE4 in the third subframe and therefore the dedicated frequency bands (the first and sixth resource blocks) for user device UE4 in the third subframe are also not fully utilized.

Also, with this scheduling method, it is necessary to reserve resources for second control channels as much as necessary for all user devices to transmit CQIs and delivery confirmation information (ACK/NACK). Because the delivery confirmation information (ACK/NACK) is used to determine whether to retransmit data, the delivery confirmation information (ACK/NACK) directly affects data throughput and is preferably reported to the base station as quickly as possible. For this reason, resources for the delivery confirmation information (ACK/NACK) are reserved in every subframe according to the total number of user devices receiving downlink data channels. On this point, resources for the delivery confirmation information (ACK/NACK) are different from resources for CQIs that are reported to the base station at predetermined intervals. With the above scheduling method, if the number of actual user devices is less than the maximum number of user devices defined in a system, only a part of resources reserved for the maximum number of user devices is used and as a result, the resource use efficiency is reduced.

One object of the present invention is to improve the radio resource use efficiency in a mobile communication system employing a single carrier scheme for uplink.

Means for Solving the Problems

An aspect of the present invention provides a radio base station used in a mobile communication system employing a single carrier scheme for uplink. The radio base station includes a scheduler configured to allocate radio resources such that a first control channel accompanying an uplink data channel is transmitted using a same frequency band allocated to the uplink data channel and a second control channel, which is to be transmitted regardless of presence or absence of the uplink data channel, is transmitted using a dedicated frequency band reserved for the second control channel if no frequency band is allocated to the uplink data channel; and a reporting unit configured to report scheduling information indicating the allocation results to a user device. The scheduler is configured not to allocate the radio resources to the uplink data channel of the user device in a unit transmission period reserved for transmission of the second control channel of the user device.

Advantageous Effect of the Invention

An aspect of the present invention makes it possible to improve the radio resource use efficiency in a mobile communication system employing a single carrier scheme for uplink.

EXPLANATION OF REFERENCES

Figure 1:
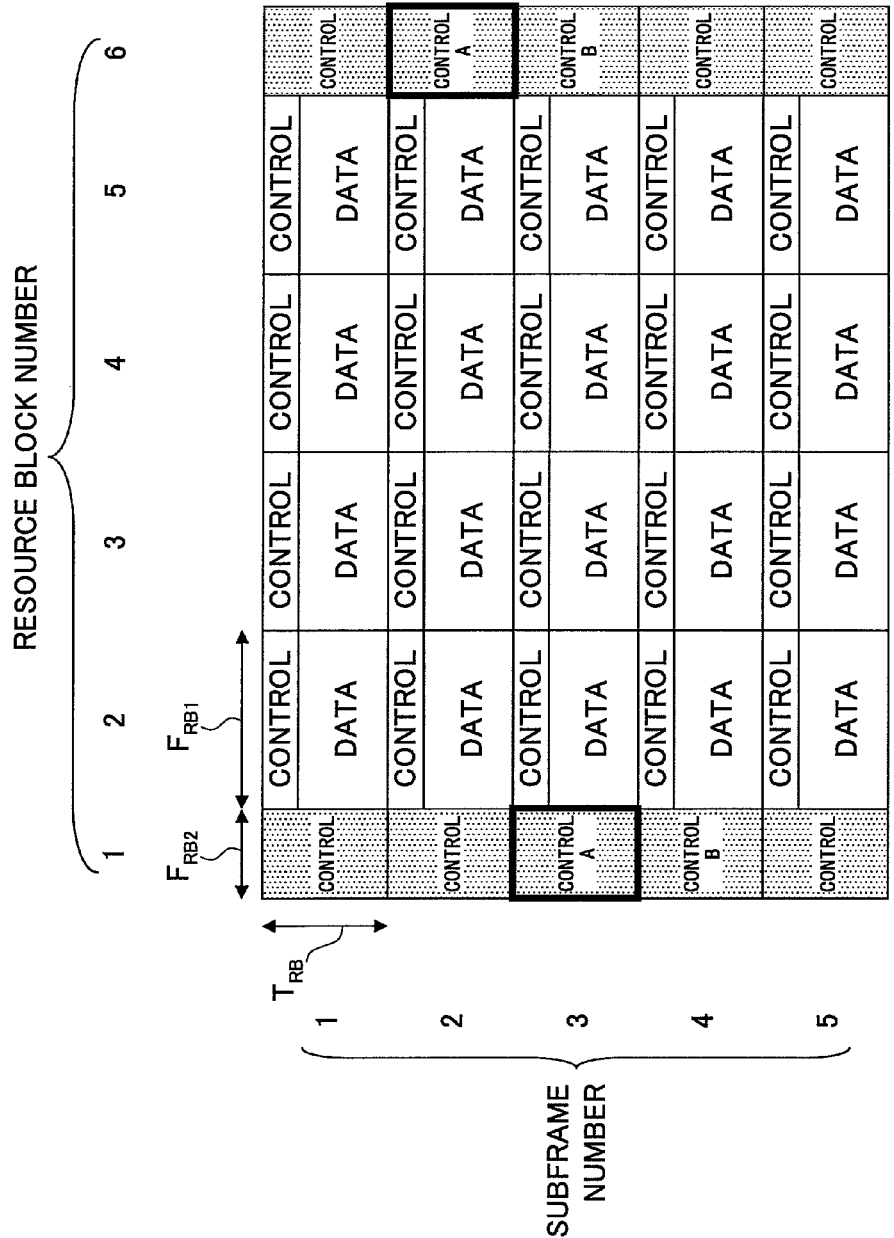
FIG. 1 is a drawing illustrating an example of frequency band allocation in a mobile communication system.
Figure 2:
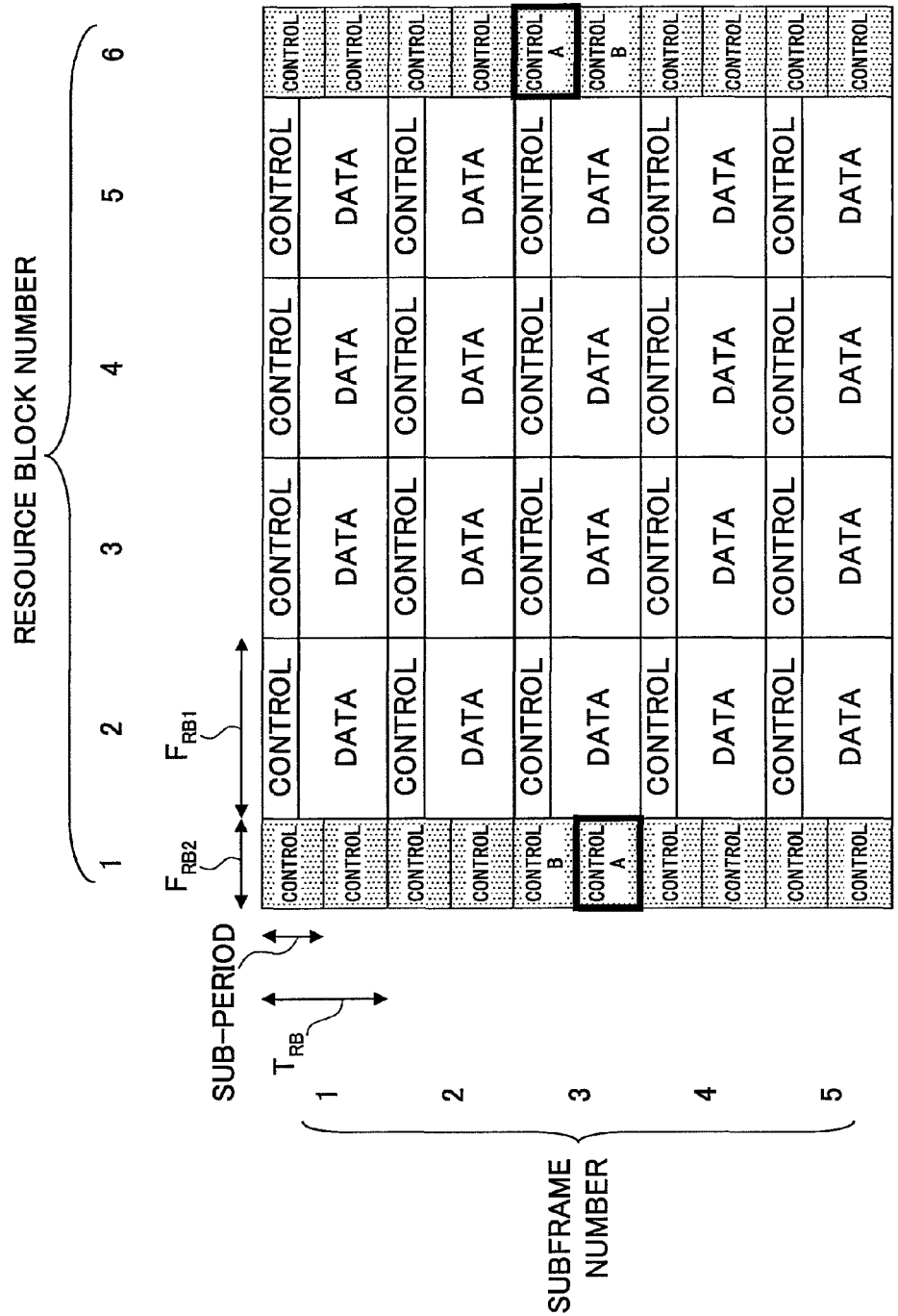
FIG. 2 is a drawing illustrating another example of frequency band allocation in a mobile communication system.

231 Pilot channel generating unit
233 Shared control channel generating unit
234 Shared data channel generating unit
235 Multiplexing unit
236, 241 Discrete Fourier transform unit
237, 242 Mapping unit

238, 243 Inverse fast Fourier transform unit
244 Separating unit
246 CQI measuring unit
247 Scheduler

BEST MODE FOR CARRYING OUT THE INVENTION

In the embodiments described below, various uplink channels are transmitted. Those uplink channels are roughly categorized into (A) uplink shared data channels, (B) shared control channels, and (C) pilot channels.

(A) Uplink Shared Data Channel

An uplink shared data channel (or an uplink data channel) includes traffic data and/or a layer 3 control message. The layer 3 control message may include handover information and information used for retransmission control. One or more resource blocks (may also be called frequency chunks) are allocated to an uplink shared data channel according to results of time and frequency scheduling. In the scheduling, the base station allocates resources in the time domain or in the time and frequency domains such that users with good channel conditions can transmit packets in preference to other users.

(B) Uplink Shared Control Channel

Uplink shared control channels include first control channels and second control channels described above and are used to transmit physical control messages and layer 2 control messages (FFS). The base station performs scheduling and thereby allocates resource blocks to user devices such that contention of shared control channels is prevented. The base station performs scheduling for uplink shared control channels taking into account the number of users. In this case, it is preferable to perform accurate transmission power control to keep the packet error rate low. Also, uplink shared control channels are preferably transmitted across a wide frequency range to achieve frequency diversity gain and thereby to improve the reception quality of packets.

An uplink shared control channel includes one or more of (1) control information related to a scheduled uplink shared data channel, (2) control information related to a scheduled downlink shared data channel, (3) control information for changing scheduling parameters for uplink shared data channels, and (4) control information for scheduling downlink shared data channels.

The control information (1) related to a scheduled uplink shared data channel is transmitted together with the scheduled uplink shared data channel. In other words, the control information (1) is transmitted only when a scheduled uplink shared data channel is transmitted. The control information (1) is also called an associated control channel or essential control information and includes information (e.g., modulation scheme and channel coding rate) necessary to demodulate a shared data channel, a transmission block size, and retransmission control information. The control information (1) is, for example, represented by 14 bits. The retransmission control information may include information indicating whether a packet to be transmitted via the uplink shared data channel is a retransmission packet or a new packet and information indicating the use of the retransmission packet. In a first use, the data of the retransmission packet are the same as the data (e.g., initial transmission data) of a previously transmitted packet. In a second use, the data of the retransmission packet may be different from that of a previously transmitted packet. In the second use, the retransmission packet may be combined with redundant information for error correction coding.

The control information (2) related to a scheduled downlink shared data channel is transmitted from a mobile station to a base station only when the scheduled downlink shared data channel transmitted from the base station is received by the mobile station. The control information (2) indicates whether a downlink packet is correctly received (ACK/NACK). The simplest form of the control information (2) may be represented by one bit.

The control information (3) for changing scheduling parameters for uplink shared data channels is used to report a buffer size and/or transmission power of a mobile station to a base station. The control information (3) may be transmitted either regularly or irregularly. For example, the control information (3) may be transmitted from the mobile station when its buffer size and/or transmission power changes. The base station performs scheduling taking into account such parameter changes of the mobile station. Scheduling parameters such as a buffer size and transmission power may be represented, for example, by 10 bits.

The control information (4) for scheduling downlink shared data channels is used to report downlink channel quality information (channel quality indicator (CQI)) of the mobile station to the base station. The CQI is, for example, represented by a received SIR measured by the mobile station. The control information (4) may be transmitted either regularly or irregularly. For example, the control information (4) may be transmitted to the base station when the channel quality changes. The control information (4) is, for example, represented by five bits.

(C) Pilot Channel

A pilot channel may be transmitted from a mobile station by time division multiplexing (TDM), frequency division multiplexing (FDM), code division multiplexing (CDM), or a combination of them. Among them, TDM is preferably used to reduce the peak-to-average power ratio (PAPR). Orthogonalizing a pilot channel and a data channel by TDM makes it possible to accurately separate the pilot channel at a receiving end and thereby makes it possible to improve the accuracy of channel estimation.

Although the present invention is described below in different embodiments, the distinctions between the embodiments are not essential for the present invention, and the embodiments may be implemented individually or in combination.

FIRST EMBODIMENT

Figure 4:
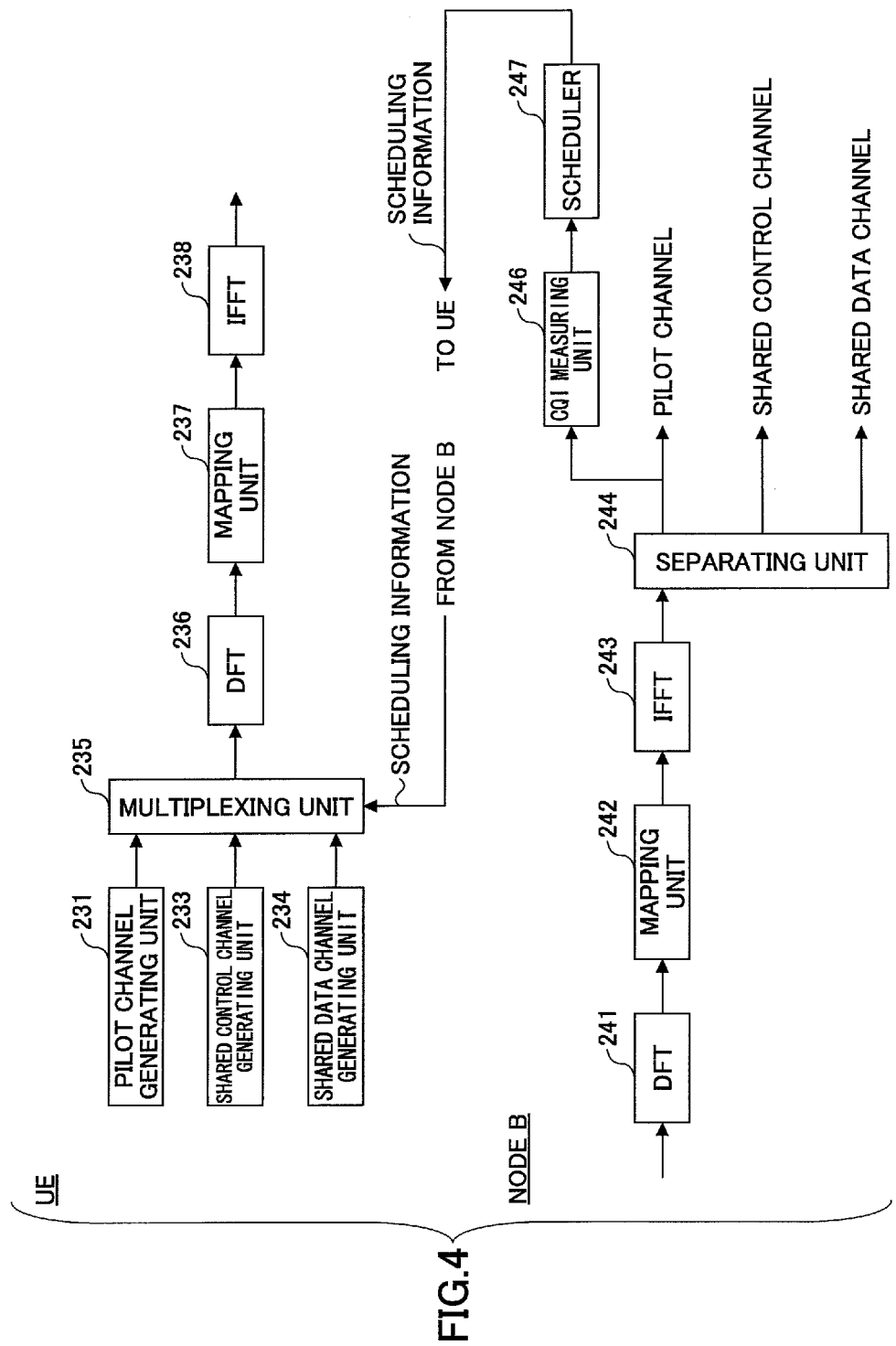
FIG. 4 is a drawing illustrating a user device and a base station according to an embodiment of the present invention.

FIG. 4 is a schematic block diagram illustrating a user device (user equipment: UE) and a base station (node B) according to an embodiment of the present invention. The user device shown in FIG. 4 includes a pilot channel generating unit 231, a shared control channel generating unit 233, a shared data channel generating unit 234, a multiplexing unit 235, a discrete Fourier transform unit (DFT) 236, a mapping unit 237, and an inverse fast Fourier transform unit (IFFT) 238.

The pilot channel generating unit 231 generates an uplink pilot channel.

The shared control channel generating unit 233 generates a shared control channel that may include various types of control information. As described above, a shared control channel includes (1) essential control information, (2) information indicating whether a downlink channel is correctly received: acknowledge (ACK) or negative acknowledge (NACK), (3) information for changing scheduling parameters, or (4) a channel quality indicator (CQI) indicating the reception quality of a downlink pilot channel.

The shared data channel generating unit 234 generates an uplink shared data channel. The shared data channel and the shared control channel are modulated by a specified data modulation scheme and are encoded by a specified channel coding scheme.

The multiplexing unit 235 multiplexes one or more channels according to scheduling information sent from the base station and outputs the multiplexed signal (the scheduling information is also input to the channel generating units 231, 233, and 234). For uplink, various channel mapping patterns may be used. Therefore, it is not always necessary to multiplex all channels shown in FIG. 4. In other words, one or more of the channels are multiplexed as needed. In this example, the multiplexing unit 235 time-division-multiplexes channels and the mapping unit 237 maps the multiplexed signal to frequency components.

The discrete Fourier transform unit (DFT) 236 Fourier-transforms an input signal (in this example, the multiplexed signal). This discrete Fourier transformation is performed because the signal at this stage represents discrete digital values. As a result of this Fourier transformation, a signal sequence arranged in order of time is represented in the frequency domain.

The mapping unit 237 maps discrete-Fourier-transformed signal components to subcarriers in the frequency domain. For example, the mapping unit 237 performs localized FDM or distributed FDM. In localized FDM, a frequency band is divided along the frequency axis into sub-bands corresponding to the number of users. In distributed FDM, phases of user signals are adjusted such that different sets of comb-like frequency components arranged at regular intervals are allocated to the respective users. Signal processing in this embodiment may be performed by any method where a signal is Fourier-transformed, processed in the frequency domain, and then inverse-Fourier-transformed as illustrated in FIG. 4. Alternatively, signal processing may be performed by variable spreading chip repetition factor-CDMA (VSCRF-CDMA). In either case, this embodiment makes it possible to handle a signal with multiple frequency spectra even in a system employing a single carrier scheme.

The inverse fast Fourier transform unit 238 inverse-fast-Fourier-transforms the mapped signal components and outputs a signal sequence arranged in order of time.

FIG. 4 also shows a base station according to an embodiment of the present invention. The base station shown in FIG. 4 includes a discrete Fourier transform unit (DFT) 241, a mapping (demapping) unit 242, an inverse fast Fourier transform unit (IFFT) 243, a separating unit 244, a CQI measuring unit 246, and a scheduler 247.

The discrete Fourier transform unit (DFT) 241 Fourier-transforms an input signal (in this example, a received signal). As a result of this Fourier transformation, a signal sequence arranged in order of time is represented in the frequency domain.

The mapping unit 242 extracts subcarrier components from the Fourier-transformed signal. In other words, the mapping unit 242 extracts a signal multiplexed, for example, by localized FDM or distributed FDM.

The inverse fast Fourier transform unit 243 inverse-fast-Fourier-transforms the extracted signal components and outputs a signal sequence arranged in order of time.

The separating unit 244 separates one or more channels in the signal sequence and outputs the channels. In this example, the demapping unit 242 restores a signal mapped to frequency components to its original form before mapping and the separating unit 244 separates time-division-multiplexed signals.

The CQI measuring unit 246 measures the received signal quality (received SIR and/or CQI) of an uplink pilot channel and estimates channel conditions based on the measured signal quality.

The scheduler 247 allocates uplink resources to user devices based on channel conditions of the user devices (performs scheduling). The scheduler 247 allocates resources preferentially to user devices with good channel conditions. The base station also performs downlink scheduling. However, descriptions of downlink scheduling are omitted here. The scheduler 247 sends scheduling information indicating resource allocation results to the user devices.

One or more channels generated by the channel generating units of the user device are time-division-multiplexed (switched appropriately) by the multiplexing unit 235 and the multiplexed signal is transformed into a signal in the frequency domain by the DFT 236. The transformed signal is properly mapped to frequency components by the mapping unit 237 and the mapped signal is transformed into a time-series signal by the IFFT 238. Then, the time-series signal is wirelessly transmitted via a processing unit such as a radio transmission unit (not shown). The transmitted signal is received by the base station. The received signal is transformed into a signal in the frequency domain by the DFT 241. The transformed signal, which is mapped to frequency components, is restored to its original form before mapping by the demapping unit 242. The restored signal is transformed by the IFFT 243 into a time-series signal and the separating unit 244 properly separates time-division-multiplexed signals in the time-series signal. Then, a processing unit (not shown) further processes, e.g., demodulates, the signals. The CQI measuring unit 246 estimates uplink channel conditions based on a received pilot channel and the scheduler 247 performs uplink scheduling based on the uplink channel conditions and sends scheduling information indicating the scheduling results to the user device.

Figure 5:
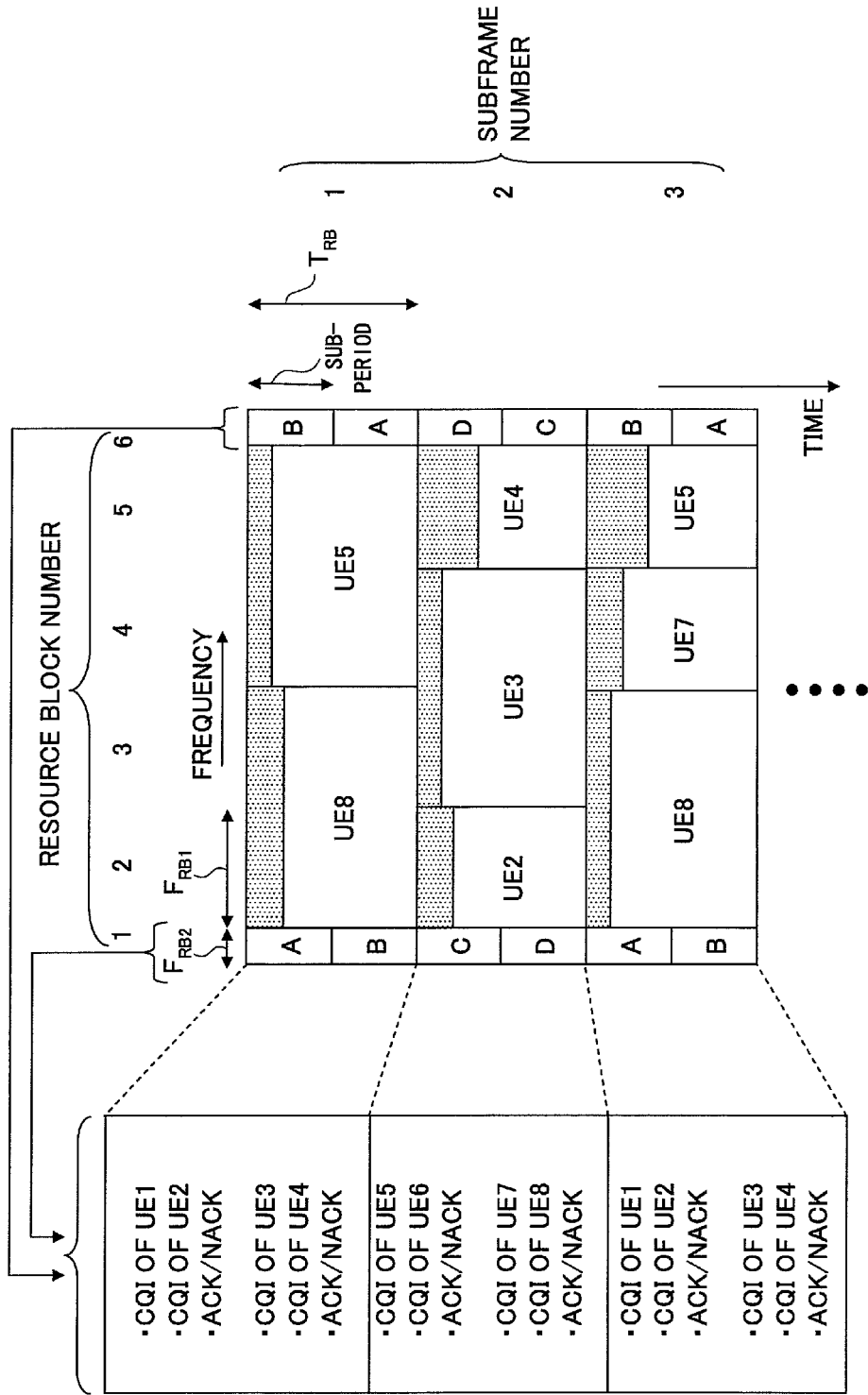
FIG. 5 is a drawing illustrating an example of frequency band allocation according to an embodiment of the present invention.

FIG. 5 is a drawing illustrating an example of frequency band allocation according to an embodiment of the present invention. In this embodiment, the base station (scheduler) determines user devices to each of which one or more of the resource blocks (the second through fifth resource blocks) are to be allocated taking into account the timings when the user devices transmit second control channels.

Figure 3:
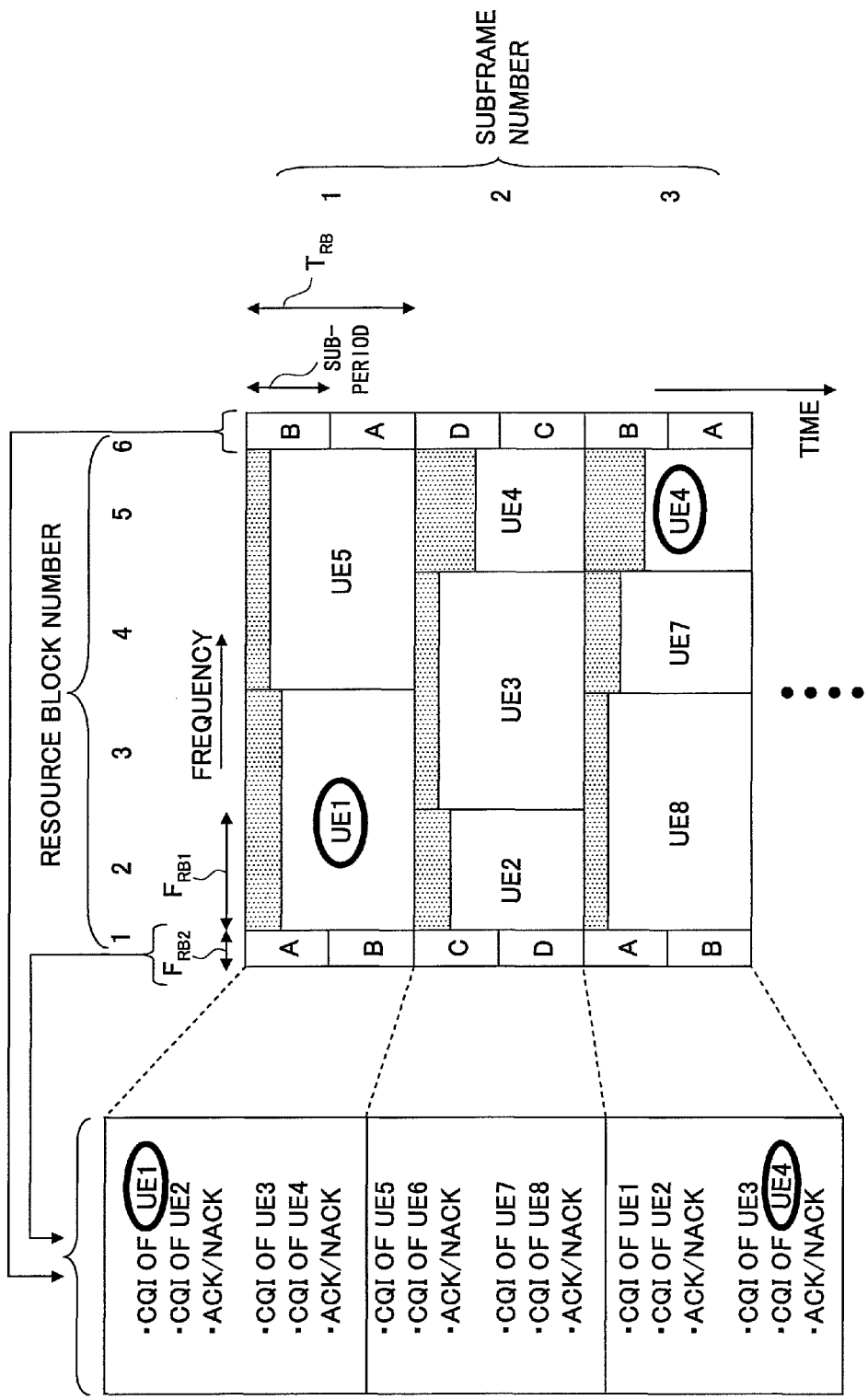
FIG. 3 is a drawing illustrating another example of frequency band allocation in a mobile communication system.

In the example shown in FIG. 3, when the second and third resource blocks in the first subframe are allocated to user device UE1 based on the channel conditions, resources (dedicated frequency bands) labeled "A" become unused or unoccupied. In this embodiment, if it is confirmed that user devices UE1 through UE4 are going to transmit control channels using dedicated frequency bands (the first and sixth resource blocks) labeled "A" and "B" in the first subframe, the base station refrains from allocating resource blocks for data channel transmission of user devices UE1 through UE4 in the first subframe. In other words, the base station allocates the second through fifth resource blocks in the first subframe to user devices other than user devices UE1 through UE4. In this example, the second and third resource blocks are allocated to user device UE8 instead of user device UE1. Similarly, in the third subframe, the base station allocates the second through fifth resource blocks to user devices other than user devices UE1 through UE4. In this example, the fifth resource block is allocated to user device UE5 instead of user device UE4 (in FIG. 3).

According to the first embodiment, the base station determines user devices that are going to transmit second control channels in a subframe and allocates resource blocks for data channel transmission in the subframe to user devices other than the determined user devices. This method or configuration makes it possible to improve the use efficiency of radio resources.

SECOND EMBODIMENT

Figure 6:
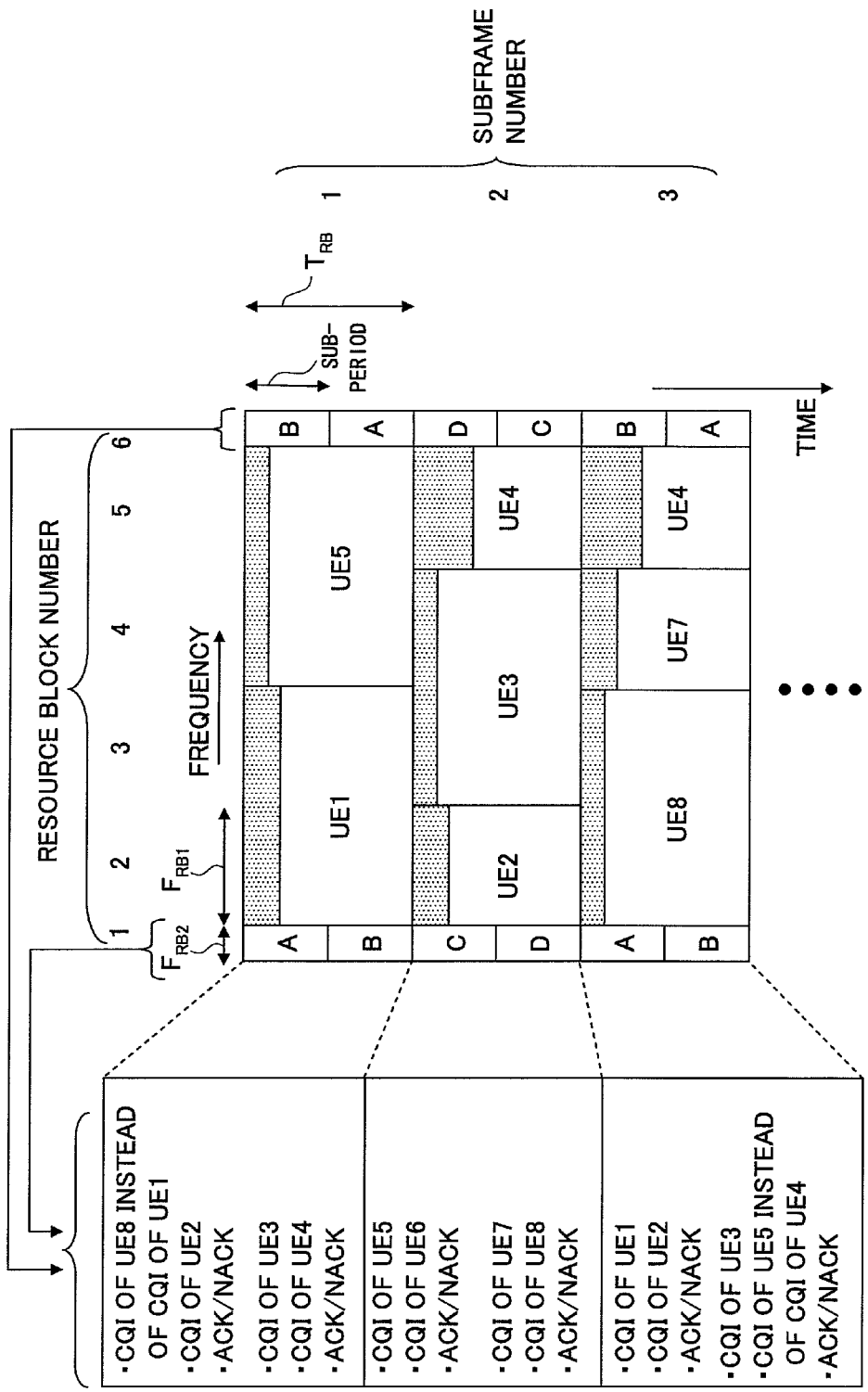
FIG. 6 is a drawing illustrating another example of frequency band allocation according to an embodiment of the present invention.

FIG. 6 is a drawing illustrating another example of frequency band allocation according to an embodiment of the present invention. In the first embodiment, priority is given to transmitting second control channels using dedicated frequency bands as scheduled over transmitting uplink data channels. In the second embodiment, priority is given to uplink data channel transmission. However, if priority is given to uplink data channel transmission as shown in FIG. 3, dedicated frequency bands or resources cannot be fully utilized.

Therefore, in the second embodiment, the base station determines user devices that are going to transmit second control channels in each subframe as in the first embodiment and thereby determines dedicated frequency bands that are to be unoccupied. In the second embodiment, as shown in FIG. 6, scheduling of second control channels is changed such that unoccupied dedicated frequency bands are allocated to other user devices. In this example, the second and third resource blocks in the first subframe are allocated to user device UE1 and some of the dedicated frequency bands in the first subframe become unoccupied. Therefore, allocation of the dedicated frequency bands is changed so that the unoccupied frequency bands (or resources) are used for second control channel transmission by a user device other than user device UE1. For example, the second control channel of user device UE1 originally scheduled to be transmitted using the dedicated frequency bands "A" in the first subframe is, instead, transmitted using the allocated second and third resource blocks. The dedicated frequency bands "A", in turn, are reallocated for transmission of the second control channel of user device UE8. Similarly, the second control channel of user device UE4 originally scheduled to be transmitted using the dedicated frequency bands "B" in the third subframe is, instead, transmitted using the allocated fifth resource block. The dedicated frequency bands "B", in turn, are reallocated for transmission of the second control channel of user device UE5. With this method of the second embodiment, it is necessary to report the change in the allocation of dedicated frequency bands for second control channels to the user devices.

THIRD EMBODIMENT

Figure 7:
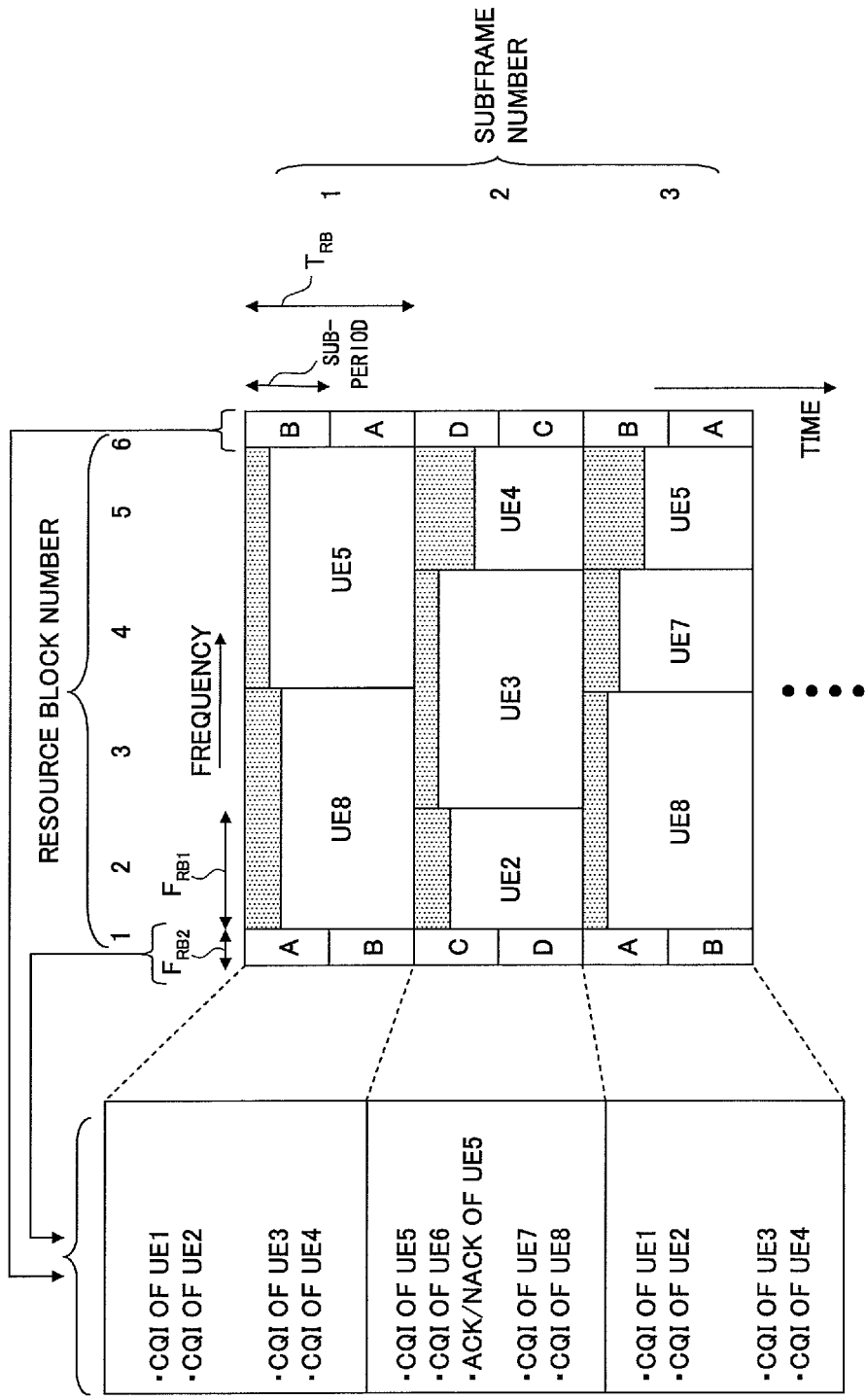
FIG. 7 is a drawing illustrating another example of frequency band allocation according to an embodiment of the present invention.

FIG. 7 is a drawing illustrating another example of frequency band allocation according to an embodiment of the present invention. In the first and second embodiments, resources are reserved for second control channels as much as necessary for all user devices to transmit CQIs and delivery confirmation information (ACK/NACK). In a third embodiment of the present invention, resources are reserved for reporting CQIs, but resources are not reserved for reporting delivery confirmation information (ACK/NACK). In this embodiment, delivery confirmation information (ACK/NACK) for downlink data channels is transmitted using a part of dedicated frequency bands or frequency bands allocated to uplink data channels as necessary. In the example shown in FIG. 7, delivery confirmation information (ACK/NACK) for a data channel sent to user device UE5 is transmitted in the second subframe. Here, it is assumed that resources for reporting a CQI are reserved for user device UE5 in the second subframe. In this example, the CQI and the delivery confirmation information (ACK/NACK) of user device UE5 are multiplexed and transmitted in dedicated frequency bands labeled "C".

Figure 8:
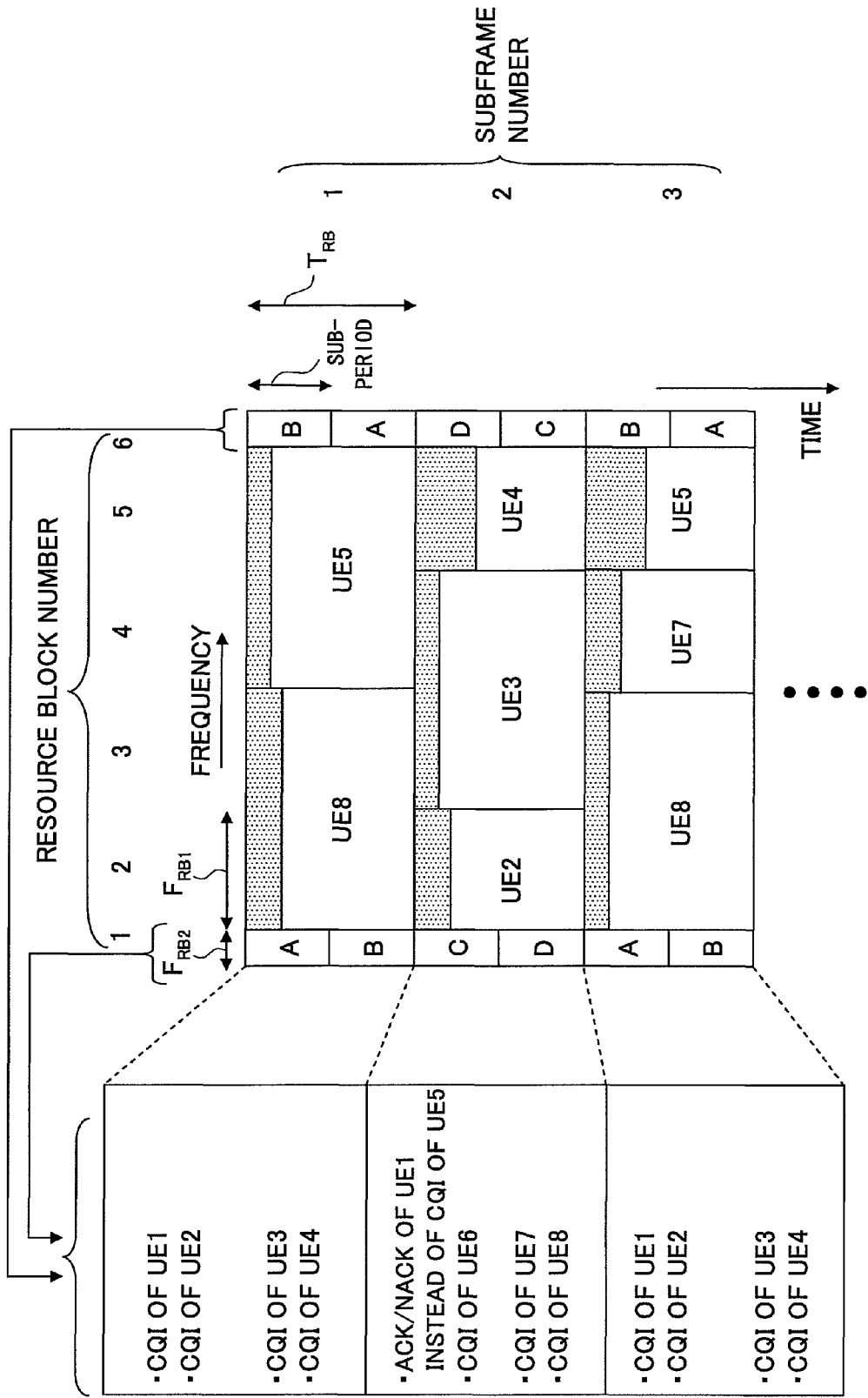
FIG. 8 is a drawing illustrating another example of frequency band allocation according to an embodiment of the present invention.

FIG. 8 shows still another example of frequency band allocation. In the example shown in FIG. 7, the delivery confirmation information (ACK/NACK) of user device UE5 is coincidentally generated at a CQI reporting interval of user device UE5 and is therefore transmitted together with the CQI. In the example shown in FIG. 8, it is assumed that the delivery confirmation information (ACK/NACK) of user device UE1 is generated in the second subframe. In this case, it is not possible to multiplex a CQI and delivery confirmation information (ACK/NACK) as in the above case. Therefore, the base station changes the allocation of dedicated frequency bands for second control channels such that the delivery confirmation information (ACK/NACK) of user device UE1 is transmitted instead of a CQI of user device UE5 using the dedicated frequency bands originally reserved for the CQI. In this case, no CQI of user device UE5 is reported in the second subframe. However, this does not cause a serious problem because a CQI of user device UE5 is to be reported in the next interval (the fourth subframe).

Still, if it is preferable to transmit CQIs of user device UE5 every two subframes as scheduled, one of the following two methods may be used instead:

(1) Allocate a data channel transmission resource block in the second subframe to user device UE1 for transmission of the delivery confirmation information (ACK/NACK) (in this case, the CQI of user device UE5 is reported using the dedicated frequency bands "C" as originally scheduled).

(2) Allocate the dedicated frequency bands "C" in the second subframe for transmission of the delivery confirmation information (ACK/NACK) of user device UE1 and allocate a data channel transmission resource block for transmission of the CQI of user device UE5.

FOURTH EMBODIMENT

The amount of resources reserved for second control channels is determined such that all user devices can transmit CQIs and delivery confirmation information (ACK/NACK) even when their channel conditions are poor. However, if their channel conditions are good, it is possible to transmit second control channels with desired quality using a smaller amount of radio resources. For example, because the received power, observed at a base station, of a packet sent from a nearby user device is comparatively high, a low spreading ratio may be used for the packet (the time period used for the packet may be short). On the other hand, the received power, observed at a base station, of a packet sent from a user device at the cell edge is comparatively low and therefore a high spreading ratio is preferably used for the packet (the time period used for the packet is preferably long). In a fourth embodiment of the present invention, scheduling of dedicated frequency bands is performed taking into account channel conditions such that the number of multiplexed user devices is increased if their channel conditions are good. This method makes it possible to improve the use efficiency of radio resources.

Figure 9:
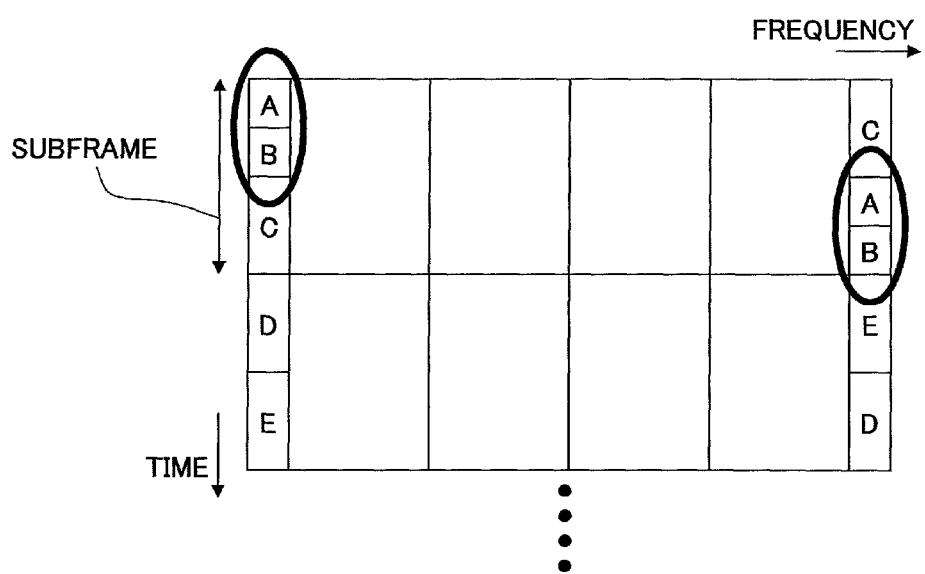
FIG. 9 is a drawing illustrating still another example of frequency band allocation according to an embodiment of the present invention.

FIG. 9 is a drawing illustrating still another example of frequency band allocation according to an embodiment of the present invention. In this example, it is assumed that user devices UE1 through UE10 are in the cell and the channel conditions of user devices UE1 through UE4 are better than those of user devices UE5 through UE10. Various methods may be used to divide user devices into groups based on channel conditions. For example, user devices may be grouped based on uplink CQIs measured at the base station, based on distances between the user devices and the base station, or based on the levels of path loss. In this embodiment, dedicated frequency bands are allocated to user devices for transmission of second control channels according to channel conditions. For example, dedicated frequency bands "A" are allocated to user devices UE1 and UE2, dedicated frequency bands "B" are allocated to user devices UE3 and UE4, dedicated frequency bands "C" are allocated to user devices UE5 and UE6, dedicated frequency bands "D" are allocated to user devices UE7 and UE8, and dedicated frequency bands "E" are allocated to user devices UE9 and UE10. The dedicated frequency bands "A" and "B" are shorter than other dedicated frequency bands because the channel conditions of user devices UE1 through UE4 are better than those of other user devices.

This embodiment makes it possible to further improve the use efficiency of radio resources by changing the amount of allocated radio resources (particularly, the time periods) according to channel conditions.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe devices in the above embodiments, those devices may be implemented by hardware, software, or a combination of them.

The present international application claims priority from Japanese Patent Application No. 2006-225919 filed on Aug. 22, 2006, the entire contents of which are hereby incorporated herein by reference.

The invention claimed is:

1. A radio base station used in a mobile communication system employing a single carrier scheme for uplink, the radio base station comprising:
 a scheduler configured to allocate radio resources such that a first control channel accompanying an uplink data channel is transmitted using a same frequency band allocated to the uplink data channel and a second control channel, which is to be transmitted regardless of presence or absence of the uplink data channel, is transmitted using a dedicated frequency band reserved for the second control channel if no frequency band is allocated to the uplink data channel; and
 a reporting unit configured to report scheduling information indicating the allocation results to a user device;
 wherein the scheduler is configured not to allocate the radio resources to the uplink data channel of the user device in a unit transmission period reserved for transmission of the second control channel of the user device.

2. A radio base station used in a mobile communication system employing a single carrier scheme for uplink, the radio base station comprising:
 a scheduler configured to allocate radio resources such that a first control channel accompanying an uplink data channel is transmitted using a same frequency band allocated to the uplink data channel and a second control channel, which is to be transmitted regardless of presence or absence of the uplink data channel, is transmitted using a dedicated frequency band reserved for the second control channel if no frequency band is allocated to the uplink data channel; and
 a reporting unit configured to report scheduling information indicating the allocation results to user devices;
 wherein the scheduler is configured to perform scheduling such that if the radio resources are allocated to the uplink data channel of one of the user devices in a unit transmission period reserved for transmission of the second control channel of the one of the user devices, the second control channel of another one of the user devices is transmitted using the dedicated frequency band and the unit transmission period reserved for the one of the user devices.

3. The radio base station as claimed in claim 2, wherein the second control channel of the another one of the user devices to be transmitted using the dedicated frequency band and the unit transmission period includes delivery confirmation information indicating an acknowledge or a negative acknowledge for a downlink data channel.

4. The radio base station as claimed in claim 1, wherein a bandwidth and an allocated time period of the dedicated frequency band reserved for the second control channel are updated according to uplink reception quality at an interval longer than the unit transmission period.

* * * * *